United States Patent
Hada et al.

(10) Patent No.: US 11,176,421 B2
(45) Date of Patent: Nov. 16, 2021

(54) SYSTEM AND METHOD FOR IMPLEMENTING NEURAL NETWORK MODELS ON EDGE DEVICES IN IOT NETWORKS

(71) Applicant: Wipro Limited, Bangalore (IN)

(72) Inventors: Nidhi Mittal Hada, Bhowanipore (IN); Debasish Chanda, Pargans (IN)

(73) Assignee: Wipro Limited, Bangalore (IN)

( * ) Notice: Subject to any disclaimer, the term of this patent is extended or adjusted under 35 U.S.C. 154(b) by 121 days.

(21) Appl. No.: 16/519,027

(22) Filed: Jul. 23, 2019

(65) Prior Publication Data

US 2020/0380306 A1 Dec. 3, 2020

(30) Foreign Application Priority Data

Jun. 3, 2019 (IN) .............................. 201941022027

(51) Int. Cl.
*G06K 9/62* (2006.01)
*G06N 3/04* (2006.01)
(Continued)

(52) U.S. Cl.
CPC ............ *G06K 9/6262* (2013.01); *G06N 3/04* (2013.01); *G06N 3/08* (2013.01); *G06N 3/10* (2013.01); *H04L 67/12* (2013.01)

(58) Field of Classification Search
CPC .......... G06K 9/6262; G06N 3/04; G06N 3/08; G06N 3/10; G06N 3/0481; G06N 3/0454; H04L 67/12
(Continued)

(56) References Cited

U.S. PATENT DOCUMENTS

2015/0278686 A1* 10/2015 Cardinaux ........... G06N 3/0454
706/22

FOREIGN PATENT DOCUMENTS

| CN | 106599939 A | 4/2017 |
|---|---|---|
| CN | 108073933 A | 5/2018 |
| WO | 2018108129 A1 | 6/2018 |

OTHER PUBLICATIONS

Cai, Ermao, et al. "Neuralpower: Predict and deploy energy-efficient convolutional neural networks." Asian Conference on Machine Learning. PMLR, 2017. (Year: 2017).*
(Continued)

*Primary Examiner* — Amandeep Saini
(74) *Attorney, Agent, or Firm* — Finnegan, Henderson, Farabow, Garrett & Dunner, LLP

(57) ABSTRACT

A method and a system for implementing neural network models on edge devices in an Internet of Things (IoT) network are disclosed. In an embodiment, the method may include receiving a neural network model trained and configured to detect objects from images, and iteratively assigning a new value to each of a plurality of parameters associated with the neural network model to generate a re-configured neural network model in each iteration. The method may further include deploying for a current iteration the re-configured neural network on the edge device. The method may further include computing for the current iteration, a trade-off value based on a detection accuracy associated with the at least one object detected in the image and resource utilization data associated with the edge device, and selecting the re-configured neural network model, based on the trade-off value calculated for the current iteration.

16 Claims, 9 Drawing Sheets

(51) Int. Cl.
*G06N 3/08* (2006.01)
*G06N 3/10* (2006.01)
*H04L 29/08* (2006.01)

(58) Field of Classification Search
USPC .......................................................... 382/103
See application file for complete search history.

(56) References Cited

OTHER PUBLICATIONS

Yang, Tien-Ju, et al. "Netadapt: Platform-aware neural network adaptation for mobile applications." Proceedings of the European Conference on Computer Vision (ECCV). 2018. (Year: 2018).*

Cai, E. et al., "NeuralPower: Predict and Deploy Energy-Efficient Convolutional Neural Networks", Arxiv.org, Cornell University Library, 201 Olin Library Cornell University, Oct. 16, 2017, 16 pages.

Yang, T., et al., "NetAdapt: Platform-aware Neural Network Adaptation for Mobile Applications", Springer nature Switzerland AG, Oct. 6, 2018, pp. 289-304.

European Search Report issued in the European Patent Office in European Application No. 19200267.3 dated Sep. 18, 2020. 11 pages.

* cited by examiner

SYSTEM AND METHOD FOR IMPLEMENTING NEURAL NETWORK MODELS ON EDGE DEVICES IN IOT NETWORKS

TECHNICAL FIELD

This disclosure relates generally to implementing neural network models, and more particularly to a method and system of implementing neural network models on edge devices in Internet of Things (IoT) networks.

BACKGROUND

Cloud computing is an important part of various Internet of Things (IoT) devices. For example, cloud computing may include processing of data in one or more cloud servers, upon receiving data from the IoT devices. One of the applications of the IoT devices may be smart cameras used in retail stores. These smart cameras may perform video analytics, so as to aid a user in making an inference, upon detecting one or more objects in a live video. However, in such scenarios, cloud computing may not be able to meet the real-time requirement.

In the above scenarios, edge computing may be used as an alternative to cloud computing, for meeting the real-time requirement. However, edge devices employed in an edge computing environment must meet the criteria of low power, low computation, and low memory. Because of these resource constraints, Convolution Neural Network (CNN) models may not be deployable in edge devices. By way of an example, a smart camera may be mounted on a doorbell to observe whether there is any box near the door or not, and the smart camera may accordingly send a notification to a user. In this use case, the CNN model needs to be deployed on the smart camera itself. In other words, the CNN model must fit within the constraints of the edge device. It may be noted that high level accuracy of detection may not be desired, as the model may be meant for specific use case. However, it is desired that the CNN model deployment for the edge device is easy and development time is short.

Some techniques provide for object detection using a CNN model are based on faster Region CNN (RCNN). However, these faster RCNN based CNN models may not be suitable for miniature devices. Further, some techniques use CNN models like You Only Look Once (YOLO) neural network models or tiny YOLO neural network models, which may allow optimizing the neural network model to accommodate it for edge device's constraint. However, it is not possible to achieve a trade-off between model accuracy and system resource usage.

SUMMARY

In one embodiment, a method of implementing neural network models on edge devices in an Internet of Things (IoT) network is disclosed. The method may include receiving a neural network model trained and configured to detect objects from images. The method may further include iteratively assigning a new value to each of a plurality of parameters associated with the neural network model to generate a re-configured neural network model in each iteration. The method may further include deploying for a current iteration the re-configured neural network on an edge device to identify at least one object in an image, and computing for the current iteration, a trade-off value based on a detection accuracy associated with the at least one object detected in the image and resource utilization data associated with the edge device. The method may further include selecting the re-configured neural network model of the current iteration, based on the trade-off value calculated for the current iteration.

In another embodiment, an optimizing device for implementing neural network models on edge devices in an Internet of Things (IoT) network is disclosed. The optimizing device includes a processor and a memory communicatively coupled to the processor. The memory stores processor instructions, which, on execution, cause the processor to receive a neural network model trained and configured to detect objects from images. The processor instructions, on execution, may further cause the processor to iteratively assign a new value to each of a plurality of parameters associated with the neural network model to generate a re-configured neural network model in each iteration. The processor instructions, on execution, may further cause the processor to deploy for a current iteration the re-configured neural network on an edge device to identify at least one object in an image, and compute for the current iteration, a trade-off value based on a detection accuracy associated with the at least one object detected in the image and resource utilization data associated with the edge device. The processor instructions, on execution, may further cause the processor to select the re-configured neural network model of the current iteration, based on the trade-off value calculated for the current iteration.

In yet another embodiment, a non-transitory computer-readable storage medium is disclosed. The non-transitory computer-readable storage medium has stored thereon, a set of computer-executable instructions causing a computer comprising one or more processors to perform steps including receiving a neural network model trained and configured to detect objects from images; iteratively assigning a new value to each of a plurality of parameters associated with the neural network model to generate a re-configured neural network model in each iteration; deploying for a current iteration the re-configured neural network on an edge device to identify at least one object in an image; computing for the current iteration, a trade-off value based on a detection accuracy associated with the at least one object detected in the image and resource utilization data associated with the edge device; and selecting the re-configured neural network model of the current iteration, based on the trade-off value calculated for the current iteration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
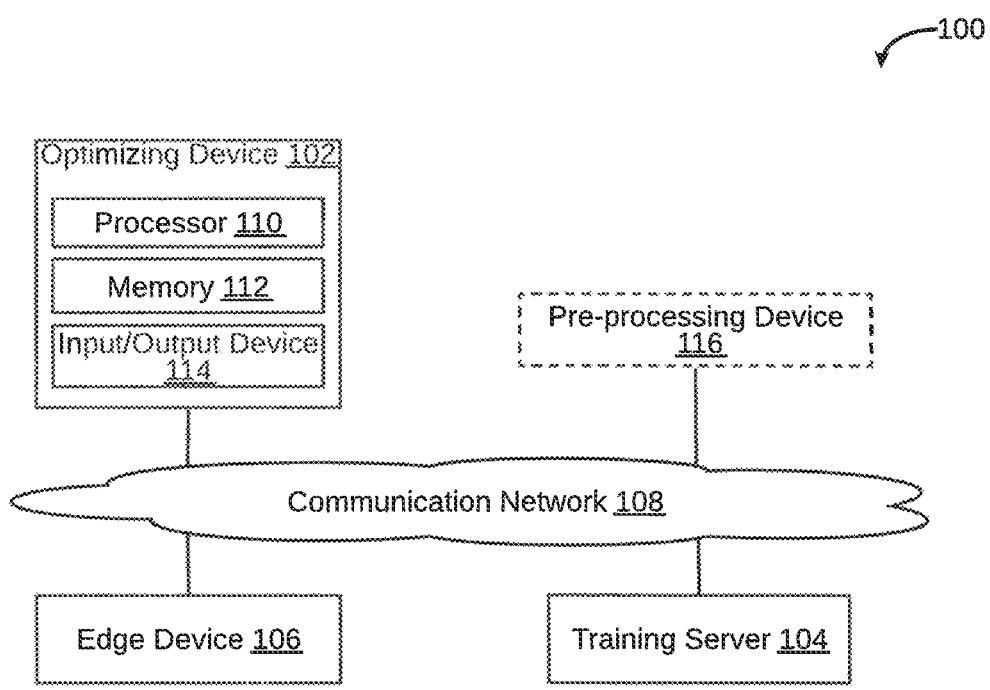
FIG. 1 illustrates a system for implementing neural network models on edge devices in an Internet of Things (IoT) network, in accordance with an embodiment.

In one embodiment, a system 100 for implementing neural network models on edge devices in an Internet of Things (IoT) network is illustrated in the FIG. 1, in accordance with an embodiment. The system 100 may include an optimizing device 102 and an edge device 106. The optimizing device 102 may be a computing device having data processing capability. In particular, the optimizing device 102 may have capability for re-configuring neural networks. Examples of the optimizing device 102 may include, but are not limited to a server, a desktop, a laptop, a notebook, a netbook, a tablet, a smartphone, a mobile phone, an application server, a sever, or the like. The edge device 106 may be a computing device that has image capturing capability. The edge device 106 may include, but are not limited to, a still camera, a video camera, or the like. The edge device 106 may be communicatively coupled to the optimizing device 102 via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

In some embodiments, the optimizing device 102 may receive a neural network model trained and configured to detect objects from images, from a training server 104. To this end, the optimizing device 102 may be coupled to a training server 104, via the communication network 108. The training server 104 may be a computing device that has capabilities of generating the neural network model, and training the neural network model, such that, it is configured to detect objects from images. Examples of the training server 104 may include, but are not limited to, a server, a desktop, a laptop, a notebook, a netbook, a tablet, a smartphone, a mobile phone, an application server, or the like.

As will be described in greater detail in conjunction with FIG. 2 to FIG. 8, in order to implement neural network models on edge devices in an IoT network, the optimizing device 102 may receive a neural network model trained and configured to detect objects from images. The optimizing device 102 may further iteratively assign a new value to each of a plurality of parameters associated with the neural network model to generate a re-configured neural network model in each iteration. The optimizing device 102 may further deploy for a current iteration the re-configured neural network on an edge device to identify at least one object in an image. The optimizing device 102 may further compute for the current iteration, a trade-off value based on a detection accuracy associated with the at least one object detected in the image and resource utilization data associated with the edge device, and select the re-configured neural network model of the current iteration, based on the trade-off value calculated for the current iteration.

In order to perform the above discussed functionalities, the optimizing device 102 may include a processor 110 and a memory 112. The memory 112 may store instructions that, when executed by the processor 110, cause the processor 110 to implement neural network models on edge devices in an IoT network, as discussed in greater detail in FIG. 2 to FIG. 8. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., neural network model, parameter data, object data, trade-off value data, pre-processing data, predefined threshold data, loss function data, memory usage data, Millions of Instructions Per Second (MIPS) usage data, etc.) that may be captured, processed, and/or required by the system 100.

The optimizing device 102 may further include one or more input/output device 114 through which the optimizing device 102 may interact with a user and vice versa. By way of an example, the input/output device 114 may be used to render a parameter interface to a user, and receive values assigned to one or more of a plurality of parameters from the user. The system 100 may interact with one or more external devices (not shown in FIG. 1) over the communication network 108 for sending or receiving various data. Examples of the one or more external devices may include, but are not limited to a remote server, a digital device, or another computing system.

The system 100, in addition to the optimizing device 102, a training server 104, and an edge device 106, may also include a pre-processing device 116. Examples of the pre-processing device 116 may include, but are not limited to a remote server, a digital device, or another computing system. The pre-processing device 116 may receive one or more frames from the edge device 106, and may pre-process each frame and may send each frame to the training server 104 in order to build a neural network model. Additionally, the pre-processing device 116 may perform image augmentation, image re-sizing, normalization, and format conversion. The image augmentation may include labelling each image or frame received from the edge device 106. By way of an example, at least 1500 images per class may be labelled, so as to grow an image dataset. The image re-sizing or down-sampling may include re-sizing the image, according to a plurality of parameters. It may be noted that the input image resolution may have an effect on resources (for example, Dynamic Random Access Memory (DRAM)) consumed. The normalization may include normalizing numerals representing the image information. For example, by way of normalizing, the numerals in range from 0 to 255 may be normalized to bring in range of 0 to 1, so that the numerals may be represented in less bit width. The format conversion may include repositioning channel formats to suit standards, as in most cases, the channels work with Blue Green Red (BGR) channel format.

Figure 2:
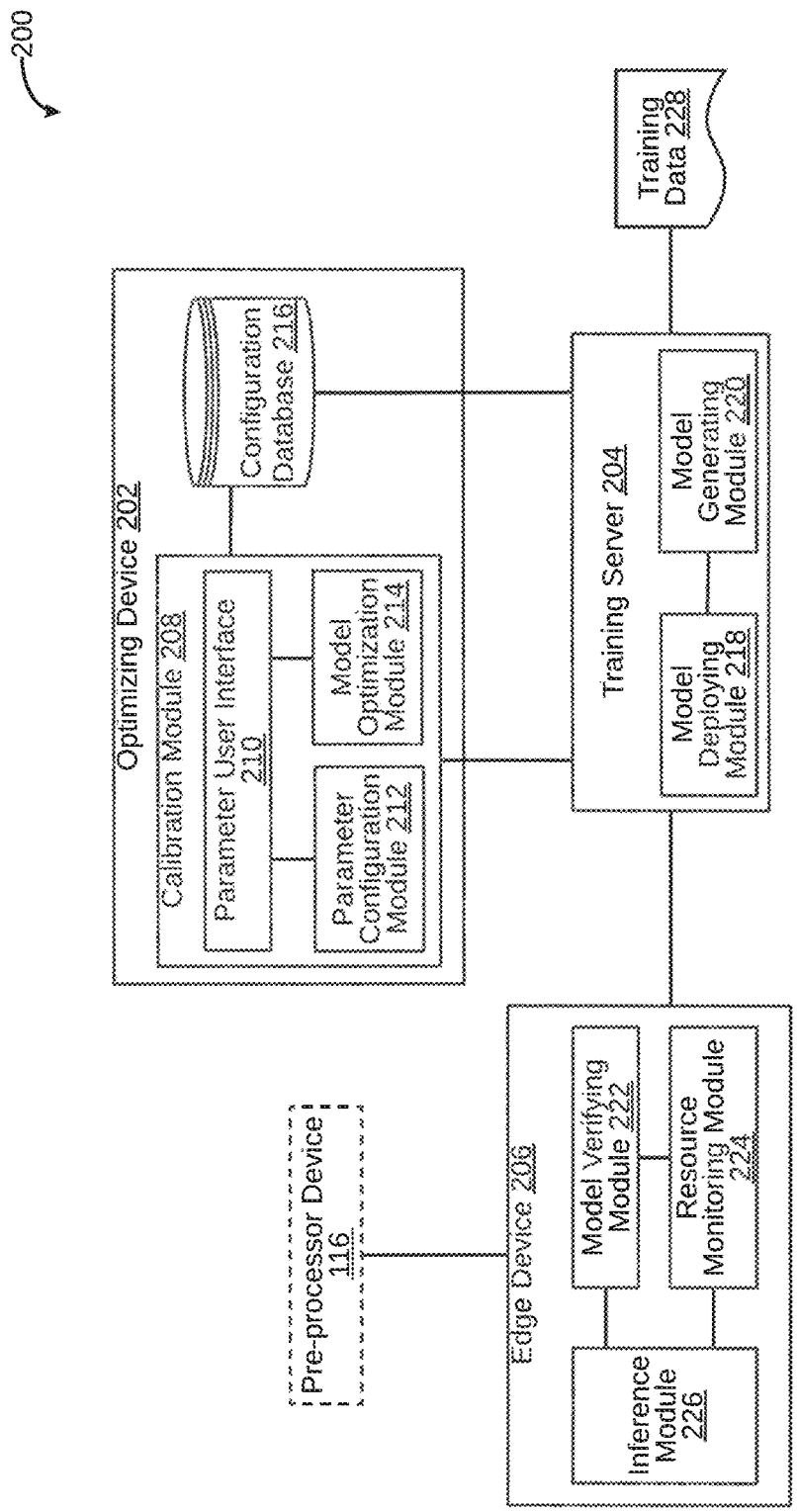
FIG. 2 illustrates a functional block diagram of a system for implementing neural network models on edge devices in an IoT network, in accordance with an embodiment.

Referring now to FIG. 2, a functional block diagram of a system 200 (analogous to the system 100) for implementing neural network models on an edge device in an IoT network is illustrated, in accordance with an embodiment. The system 200 may include an optimizing device 202, a training server 204, and an edge device 206 (analogous respectively to the optimizing device 202, the training server 104, and the edge device 106 of the system 100 of FIG. 1). Each of the optimizing device 202, the training server 204, and the edge device 206 may include one or more modules that may perform various functions so as to implement neural network models on the edge device 206 in an IoT network.

In some embodiments, the optimizing device 202 may include a calibration module 208. The calibration module 208 may further include a parameter user interface 210, a parameter configurating module 212, and a model optimization module 214. In some embodiments, the optimizing device 202 may further include a configuration database 216. In alternate embodiments, the configuration database 216 may exist outside the optimizing device 202. In such embodiments, the calibration module 208 may be communicatively coupled to the configuration database 216.

The training server 204 may include a model deploying module 218 and a model generating module 220. The training server 204 may receive training data 228 for training a neural network model. The edge device 206 may include a model verifying module 222, a resource monitoring module 224, and an inference module 226. As will be appreciated by those skilled in the art, all such aforementioned modules and databases 202-226 may be represented as the afore-mentioned combination of modules, or any other combination of different modules. Moreover, as will be appreciated by those skilled in the art, each of the modules and databases 202-226 may reside, in whole or in parts, on one device or multiple devices in communication with each other.

In some embodiments, the training server 204 may be configured to build a customized You Only Look Once (YOLO) neural network model. For example, the YOLO neural network model may include a low number of convolution layers followed by a fully connected layer. The training server 204 may use calibrated value from a calibration database (not shown in FIG. 2) to perform a trade-off between performance (including energy requirement) and quality of inference. It may be noted that objective of the YOLO neural network model may be optimizing YOLO loss function. The training server 204 may send a customized YOLO neural network model to the edge device 206.

The calibration module 208 may calibrate parameters associated with the neural network model. It may be understood that the calibration of the parameters may be a one time activity during which configuration parameters may be fine-tuned. As such, the calibration module 208 may be used for fine-tuning the configuration parameters to generate an optimized neural network model, by optimizing loss function, memory usage and MIPS usage by the edge device 206 against quality of image detection by the neural network model. The calibration may be continued till an optimization of the loss value, memory usage and MIPS usage with quality of image detection is achieved.

In some embodiments, the calibration module 208 may provide a user with a parameters user interface, such as a What-You-See-Is-What-You-Get (WYSIWYG) user interface. Using such a user interface, the user may configure various CNN parameters. The configured CNN parameters may be stored in the configuration database 216. The training server 204 may create a YOLO neural network model using the configuration parameters (stored in the configuration database 216) and the training data 228. The training server 204 may then deploy the YOLO neural network model on the edge device 206. The training server 204 may further collect resource usage details from the edge device 206. The resource usage details and loss function may be shared with the calibration module 208. A trade-off value may be calculated based on the resource usage and quality of image detection, and based on the trade-off value, the user may further configure the CNN parameters, and initiate a model deployment of the reconfigured YOLO neural network model. The above process may be repeated, until desired trade-off value is achieved.

The parameter configuration module 212 may configure the CNN parameters. Thereafter, the parameter configuration module 212 may store the parameters in the configuration database 216. The model optimization module 214 may initiate a trial run with the configured CNN parameters. The model optimization module 214 may also cause to show resource usage and model accuracy value.

The model deploying module 218 (of the training server 204) may deploy a CNN model generated by the edge device 206. The model deploying module 218 may interact with the model verifying module 222 of the edge device 106, and send the resource status and loss value to the model optimization module 214 of the calibration module 208. The model generating module 220 may generate a CNN model using training data, based on the configuration parameters stored in the configuration database 216.

The model verifying module 222 (of the edge device 206) may check the resource status from the resource monitoring module 224. The model verifying module 222 may further send detection accuracy and the resource status to the model deploying module 218 of the training server 204. The resource monitoring module 224 may monitor the system resource usage. Once the CNN model is generated, the CNN model may be deployed through the inference module 226 of the edge device 206.

The edge device 206 may be responsible for capturing an image, for example a video frame. In some embodiments, the edge device 206 may further pre-process the image, and perform object detection in the image. In some embodiments, the object detection may be performed by using an optimized neural network model and weights. The edge device 206 may include an image capturing device, such as a camera. The image capturing device may capture live video stream. In some embodiments, the live video stream may be split into multiple frames. Upon slitting the live video stream, the image capturing device may send the frames for pre-processing to the pre-processing device 116 (via the communication network 108, for example). The inference module 226 may receive a CNN model from the training server 204. It may be understood that the CNN model may be already quantized and optimized. The inference module 226 may perform object detection for the live stream, using the CNN model. The object detection may include performing classification and localization. In some cases, for example business cases, the inference may be leveraged. For example, if some object is missing from last frame, the inference module 226 may generate an alert.

Figure 3:
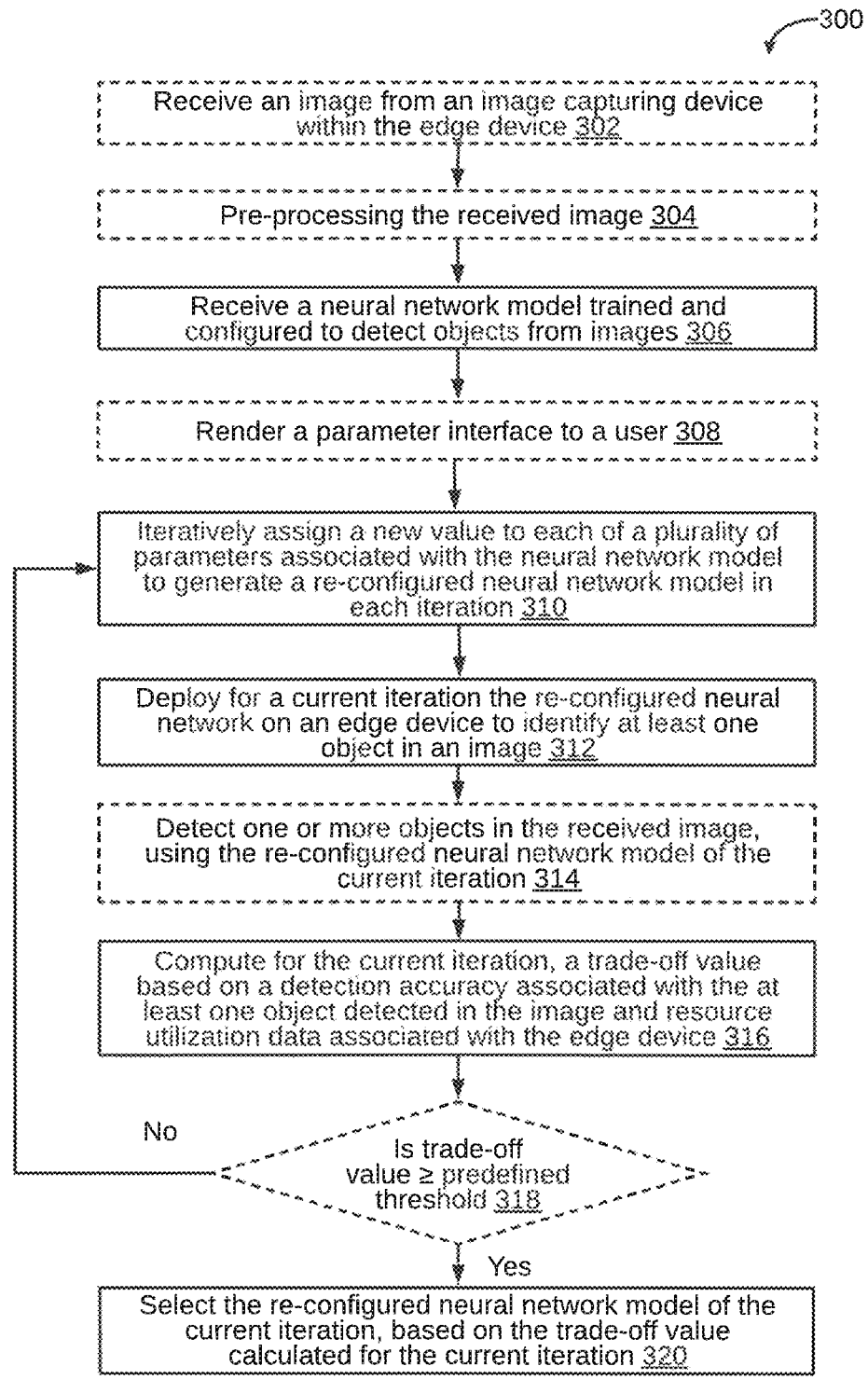
FIG. 3 illustrates a flowchart of a method for implementing neural network models on edge devices in an IoT network, in accordance with an embodiment.

Referring now to FIG. 3, a flowchart 300 of a method for implementing neural network models on edge devices in an IoT network is illustrated, in accordance with an embodiment. The flowchart 300 includes the following steps, which have been explained later in greater detail. At step 302, an image may be received from an image capturing device within the edge device 106. At step, 304, the received image may be pre-processed. At step 308, a parameters interface may be rendered to a user. At step 306, a neural network model trained and configured to detect objects from images may be received. At step 308, a parameters interface may be rendered to a user. At step 310, a new value may be iteratively assigned to each of a plurality of parameters associated with the neural network model to generate a re-configured neural network model in each iteration. At step 312, the re-configured neural network may be deployed for a current iteration on an edge device to identify at least one object in an image. At step 314, one or more objects may be detected in the received image, using the re-configured neural network model of the current iteration. At step 316, a trade-off value may be computed for the current iteration, based on a detection accuracy associated with the at least one object detected in the image and resource utilization data associated with the edge device. At step 318, it may be checked whether the trade-off value is greater than or equal to a predefined threshold. At step 320, the re-configured neural network model of the current iteration may be selected, based on the trade-off value calculated for the current iteration. Additionally, at step 302, an image may be received from an image capturing device within the edge device.

At step 302, an image may be received from an image capturing device within the edge device 106. It may be understood that the image capturing device may include a still image camera or a video camera. At step, 304, the received image may be pre-processed. The pre-processing of the image may include image augmentation, image re-sizing, normalization, and format conversion. The image pre-processing is further explained in detail, in conjunction with FIG. 4.

Figure 4:
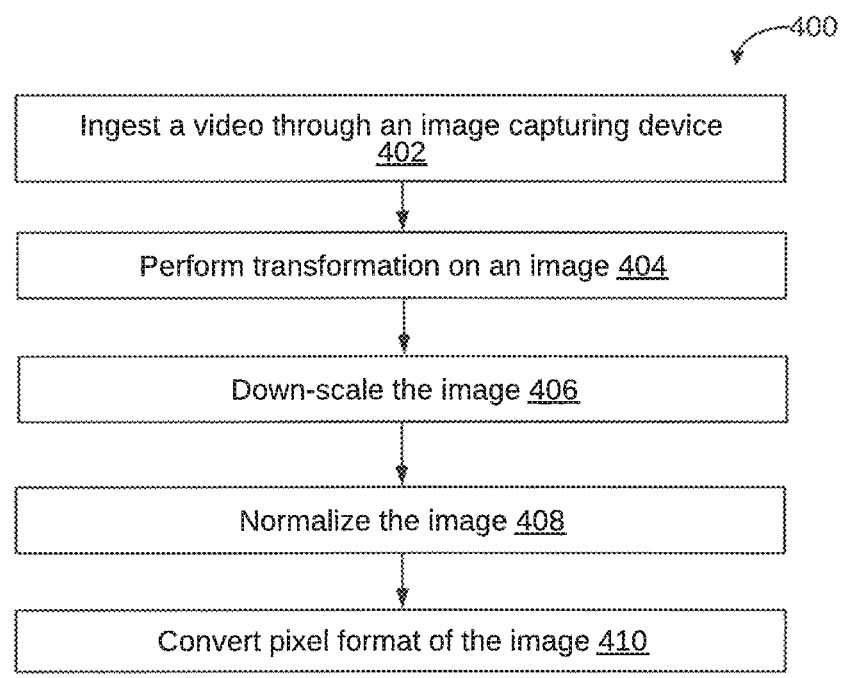
FIG. 4 illustrates a flowchart of a method for pre-processing an image, in accordance with an embodiment.

Referring now to FIG. 4, a flowchart 400 of a method for pre-processing an image is illustrated, in accordance with an embodiment. By way of an example, the pre-processing may be performed by the pre-processing device 116. At step 402, a video may be ingested through an image capturing device, such as the camera. Once the video is ingested, the one or more images (frames) may be separated. Upon separating, each of the one or more images may be labelled and annotated. At step 404, a transformation may be performed on the images. For example, affine transformation may be performed on the images, so as to preserve points, straight lines, and planes. By way of an example, the affine transformation may be of various types including translation, scaling, and rotation, which are further explained below.

For translation, the transformation matrix given below may be used:

| 1 | 0 | 0 |
|---|---|---|
| 0 | 1 | 0 |
| $t_x$ | $t_y$ | 1 |

Where, $t_x$ and $t_y$ specify displacement along x-axis and y-axis, respectively For scaling, the transformation matrix given below may be used:

| $s_x$ | 0 | 0 |
|---|---|---|
| 0 | $s_y$ | 0 |
| 0 | 0 | 1 |

Where, $s_x$ and $s_y$ specify scale factor along x-axis and y-axis respectively For rotation, the transformation matrix given below may be used:

| cos(q) | sin(q) | 0 |
|---|---|---|
| −sin(q) | cos(q) | 0 |
| 0 | 0 | 1 |

At step 406, the images in the training dataset may be down-scaled, based on the configuration parameters. As mentioned earlier, the configuration parameters may be stored in the configuration database 216. In some cases, cropping of the images may be performed so that the image quality is not affected. For example, an input image may be cropped to dimensions of 224×224. At step 408, each image in training set as available in the step 406 may be normalized, so as to scale the image in the range from 0 to 1. By way of an example, an n-dimensional greyscale image I:{X $\sqsubseteq R^n$}→{0,256} may be transformed into a new image $I_n$:{X$\sqsubseteq R^n$}→{0,1}. At step 410, the pixel format of the image be converted for compatibility. For example, the pixel format of the image be converted from Red Green Blue (RGB) to Blue Green Red (BGR), so as to make the image compatible with an open source library.

Returning back to FIG. 3, at step 306, a neural network model trained and configured to detect objects from images may be received. In some embodiments, the neural network model may be a CNN. In particular, the neural network model may be a YOLO based CNN model. In some embodiments, a single YOLO neural network model may be applied to the full image in one shot. The YOLO neural network model may divide the image into multiple grid cells. The YOLO neural network model may then predict one or more bounding boxes and probabilities for each grid cell. The bounding boxes may be weighted by the predicted probabilities. As it will be appreciated by those skilled in the art, the YOLO neural network model may make predictions with a single network evaluation, unlike systems like RCNN which require a large number (thousands) of network evaluations for a single image, therefore, making the YOLO neural network model a thousand times (1000×) faster than the RCNN, and a hundred times (100×) faster than a Faster-RCNN. This is further explained in detail in conjunction with FIG. 5.

Figure 5:
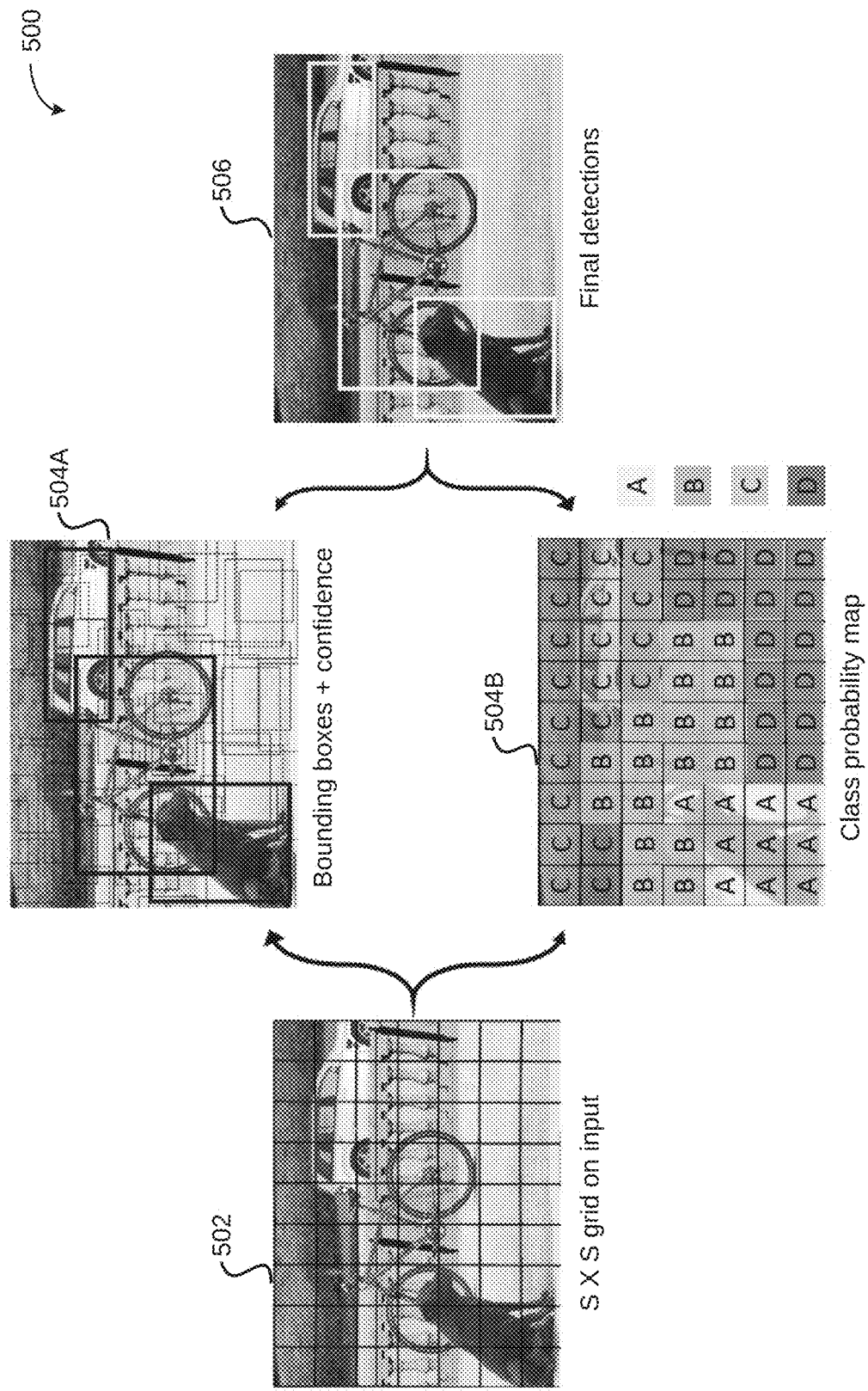
FIG. 5 illustrates a process of working of a You Only Look Once (YOLO) based CNN model for detecting objects in an image, in accordance with an exemplary embodiment.
Figure 6:
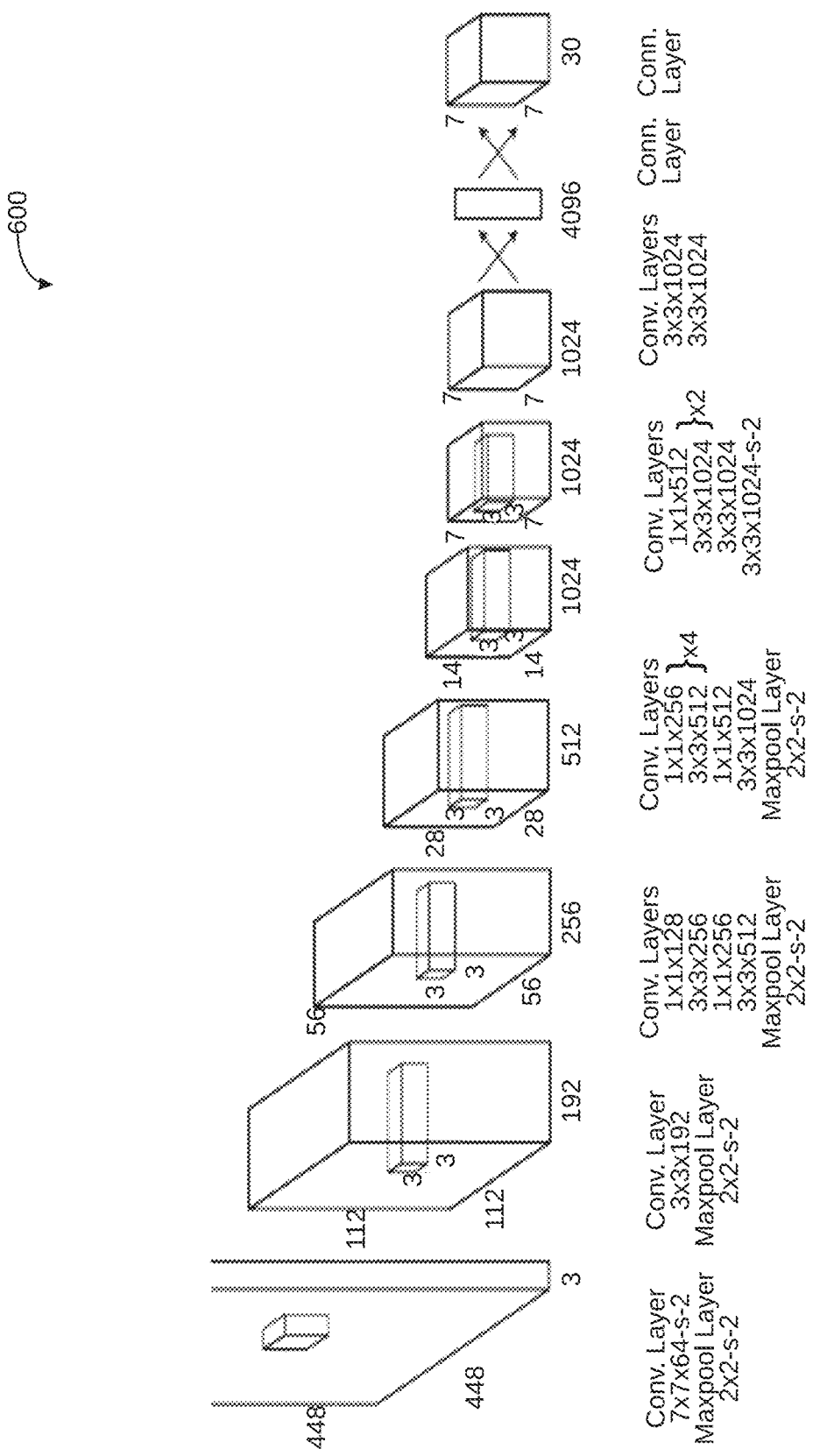
FIG. 6 illustrates a standard YOLO neural network model, in accordance with an exemplary embodiment.

Referring now to FIG. 5, an exemplary process 500 of working of a YOLO based CNN model for detecting objects in an image is illustrated. At step 502, an image may be divided into multiple grid cells by a YOLO neural network model. At step 504A, the YOLO neural network model may predict one or more bounding boxes. At the same time, at step 504B, the YOLO neural network model may predict probabilities for each grid cell, and generate a class probability map. At step 506, the YOLO neural network model may make a final decision on the detection of one or more objects in the image. In some embodiments, a miniaturized YOLO neural network model may be used. The miniaturized YOLO neural network model may be developed by miniaturizing a standard YOLO neural network model, using configuration parameters stored in the configuration database 216. An exemplary standard YOLO neural network model 600 is shown in FIG. 6, in accordance with an embodiment.

Continuing with FIG. 5, in some embodiments, the miniaturized YOLO neural network model may use eight convolution layers network. Each layer may be a combination of an input layer, a convolution layer, a maxpool layer, and an output layer. In other words, each layer may include an input layer followed by a convolution layer, followed by a maxpool layer, and further followed by an output layer (input layer>convolution layer>maxpool layer>output layer). The last convolution layer may be flattened and fully connected, so as to produce final inference as regression. The miniaturized YOLO neural network model is further explained in detail, in conjunction with FIG. 7.

By way of an example,
for, grid size(S)=7,
num_classes(C)=2, and
bounding box per grid cell(B)=2,
output number=[S*S*(C+5.B)]=7*7*(2+(5)*2)=7*7*12=588
i.e. 588 output numbers may be obtained from last layer.

Figure 7:
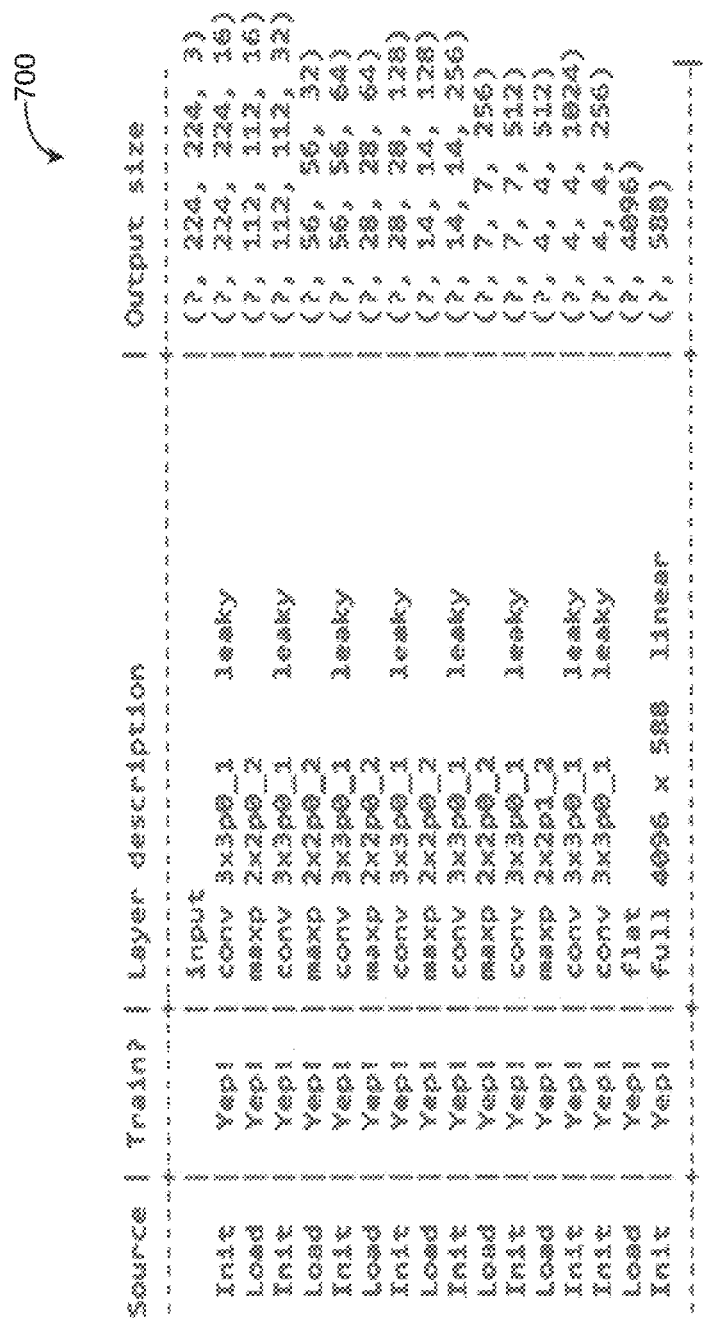
FIG. 7 illustrates a standard miniaturized YOLO neural network model, in accordance with an exemplary embodiment.

Referring now to FIG. 7, an exemplary standard miniaturized YOLO neural network model 700 is illustrated, in accordance with an embodiment. It may be noted that each pooling layer may reduce size of an input by half. Further, a maxpool, layer may be used. As it can be seen, after sixth pooling layer, the input image having dimensions 224×224 may be reduced to an image having dimensions 4×4. In some embodiments, a Leaky ReLU activation function may be used, as shown below:

$$\phi(x) = \begin{cases} x, & \text{if } x > 0 \\ 0.1x, & \text{otherwise} \end{cases}$$

Once the YOLO neural network model is generated, the YOLO neural network model may be trained. In some embodiments, the YOLO neural network model may be trained by the training server 204 using the training data 228. It may be noted that the training server 204 may further use cloud infrastructure to train the YOLO neural network model. As it will be appreciated, a large number (running into millions) of floating point operations may be performed in one epoch. In some cases, heavy computation load may require a GPU to train a model. To train the model, for every image file, appropriate data annotation should be done. Further, for each object in the image, the command line as shown below may be added in data annotation.

<object-class> <x> <y> <width> <height>

Here,
<object-class> is an integer number of object from 0 to (classes-1); and
<x> <y> <width> <height> are float values relative to width and height of image, it can be equal from 0.0 to 1.0

In some embodiments, multi-part loss function may be computed using four factors: Object/No object, co-ordinates, and class loss. The training of the YOLO neural network model may be continued until the loss reaches below a threshold value (for example, threshold value=0.6). By way of an example, the below formula may be used for loss computation:

$$\lambda_{coord} \sum_{i=0}^{S^2} \sum_{j=0}^{B} 1_{ij}^{obj} [(x_i - \hat{x}_i)^2 + (y_i - \hat{y}_i)^2] +$$

$$\lambda_{coord} \sum_{i=0}^{S^2} \sum_{j=0}^{B} 1_{ij}^{obj} \left[ \left(\sqrt{w_i} - \sqrt{\hat{w}_i}\right)^2 + \left(\sqrt{h_i} - \sqrt{\hat{h}_i}\right)^2 \right] +$$

$$\sum_{i=0}^{S^2} \sum_{j=0}^{B} 1_{ij}^{obj} (C_i - \hat{C}_i)^2 + \lambda_{noobj} \sum_{i=0}^{S^2} \sum_{j=0}^{B} 1_{ij}^{noobj} (C_i - \hat{C}_i)^2 +$$

$$\sum_{i=0}^{S^2} 1_i^{obj} \sum_{c \in classes} (p_i(c) - \hat{p}_i(c))^2$$

Returning back to FIG. 3, at step 308, a parameter interface may be rendered to a user. By using the parameters interface, the user may iteratively assign a new value to each of the plurality of parameters associated with the YOLO neural network model. By way of an example, the parameter interface may be a WYSIWYG user interface. The parameter interface may be configured to receive values assigned to one or more of the plurality of parameters from the user. In some embodiments, the values assigned to the one or more of the plurality of parameters may be stored in a configuration database 216. It may be noted that for iteratively assigning the new value to each of a plurality of parameters associated with the neural network model (at step 304), the stored value associated with each of the plurality of parameters may be retrieved from the configuration database 216. Alternatively, or additionally, the values assigned to the one or more of the plurality of parameters may be directly received from the parameter interface.

At step 310, a new value may be iteratively assigned to each of a plurality of parameters associated with the neural network model (for example, YOLO neural network model), using the parameter interface, to generate a re-configured neural network model in each iteration. The plurality of parameters may include a batch_normalize, a filter, a size, a stride, a pad, an activation, a maxpool_size, a maxpool_stride, a bit-width, a memory allocation, a batchsize, an input image resolution, an input image height, an input image width, a channel, a learning rate, an epoch, a decay of learning rate, a quantization of weights and biases, a grid-size, a bounding_box_per_grid_cell, an output_class, and a weight for Loss function. The parameter user interface is further explained in detail in conjunction with shown in FIG. 8.

Figure 8:
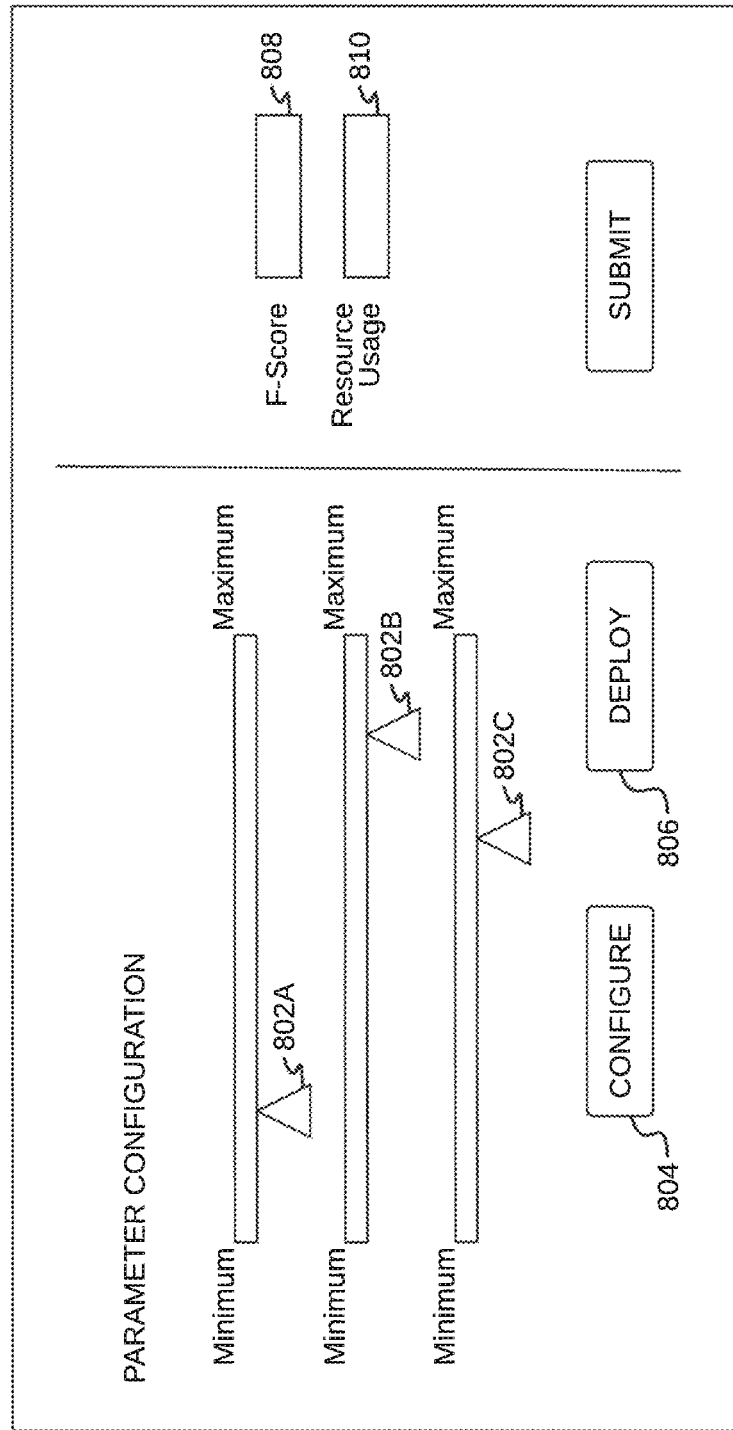
FIG. 8 illustrates a parameter user interface, in accordance with an exemplary embodiment.

Referring now to FIG. 8, an exemplary parameter user interface 800 is illustrated, in accordance with an embodiment. Each of the plurality of parameters may be configured by changing the value of the parameter. In some embodiments, a combination of parameter values for an edge device may be obtained using an import of templates. Each of the plurality of parameters may be changed using one or more sliders 802A-C. For example, {$P_1, P_2, \ldots, P_n$} may indicate a list of parameter values. Upon configuring the parameters, the parameters may be stored in the configuration database 216, by pressing a configure button 804.

It may be noted that one of configuration parameters for the YOLO neural network model may be number of layers. In order to miniaturize the YOLO neural network model, the number of layers may be reduced. It may be understood that each layer in neural network may be composed of two primary components—Convolution layer and Maxpool layer. Other configurable parameters for each neural network layer may include the following:

batch_normalize—Whether to apply batch norm to convolution layers (YES/NO)

filters—Number of kernels/filters in convolution layer (weights)

size—size of filter 3*3 stride—stride for filter pad—if padding to be done or not activation—which activation function to be used (options are ReLU sigmoid tan h etc.)

maxpool_size—for maxpool size of grid maxpool_stride—stride for maxpool bit-width—Input layers if normalized, do not consume full bit space of numeral. 4.11 is a default setting which can be reduced to reduce memory consumption memory allocation—Memory allocated to input and output layers of neural network. (This can be changed, so that most of the input image and related computation can occur in memory itself for edge devices)

Further, one or more hyper parameters may be configured in the overall neural network model, so as to obtain optimum results from training. The one or more hyper parameters may include the following:

batchsize—number of images ingested in neural network in one batch input image resolution, height and width—Input image resolution is reduced so that network computation cost reduces proportionally channels—3 for RGB learning rate—how much we are adjusting the weights of our network with respect the loss gradient. The lower the value, the slower we travel along the downward slope.

epochs—one forward pass and one backward pass of all the training data decay of learning rate—learning rate decays with training, it becomes smaller in later epochs to reach local minima of loss curve quantization of weights and biases—quantization of weights is done, so that floating point weights (32 bits) are converted to fixed point (8 bits). (This may help in reduction of computation times and memory cycles and memory space)

Furthermore, some parameters specific to the YOLO neural network model may be configured. These specific to the YOLO neural network model parameters may include the following:

gridsize bounding_box_per_grid_cell output_class weight for loss function

At step 312, the re-configured neural network model may be deployed for a current iteration on an edge device, so as to identify at least one object in an image. Once the neural network is re-configured, the re-configured neural network may be deployed by a user. By way of an example, the user may press the deploy button 806 on the parameters user interface 800 for trial deployment of the re-configured neural network with parameters configured in the previous step. Once the user has pressed the deploy button 806, the calibration module 208 may initiate deploying of the re-configured neural network model using the model deploying module 218 of the training server 204. The model optimization module 214 of the calibration module 208 may initiate model generation using model generating module 220 via the model deploying module 218 of the training server 204.

The model deploying module 218 may generate model via the model generating module 220. The model generation module 218 may read configuration parameters stored in the configuration database 216, and train the neural network model using the training data and cloud infrastructure. Additionally, new training data may be used for generating the neural network, if required. In some embodiments, Adam optimizer may be used for backpropagation for the YOLO neural network model. The training server 204 may send the generated model to the edge device 206 for deployment. The edge device 206 may provide platform services that use cross-compiler to convert the model for deploying on the edge device 206.

At step 314, one or more objects in the received image may be detected, using the re-configured neural network model of the current iteration. At step 316, a trade-off value may be computed for the current iteration, based on a detection accuracy associated with the at least one object detected in the image and resource utilization data associated with the edge device. The resource usage data associated with the edge device may correspond to a loss function, memory usage, and MIPS usage of the re-configured neural network model for the edge device.

Once the re-trained neural network model is deployed on the edge device 206, a part of the training data may be used to verify accuracy of the re-trained neural network model. In some embodiments, the model verifying module 222 of the edge device 206 may check the accuracy of the re-trained neural network model by running test data on the deployed re-trained neural network model. The model verifying module 222 may further compute a F-Score using precision (p) and recall (r), as follows:

$$F = 2 * \frac{p*r}{p+r}$$

Where, $$p = \frac{\text{number of correct positive results}}{\text{number of all positive results}}; \text{ and}$$

$$r = \frac{\text{number of correct positive results}}{\text{number of all relevant samples}}$$

The model verifying module 222 of the edge device 106 may request the resource monitoring module 224 to monitor various resources in the edge device 206, such as memory usage, MIPS, and so on. Upon calculating, the F-Score function value and the resource value may be sent to the calibration module 204. In some embodiments, the F-Score function value and the resource value may be shown in a F-Score function value box 808 and a resource value box 810 of the parameter user interface 800. The trade-off value may be computed as follows:

$$T = g\left(f\left(\frac{R_1}{TR_1}, \frac{R_2}{TR_2}, \ldots, \frac{R_n}{TR_n}\right), F\right)$$

Here, $\{R_1, R_2, \ldots R_n\}$ indicates list of resource usage; $\{TR_1, TR_2, \ldots TR_n\}$ indicates the resource available in edge devices;

F is the detection accuracy;

f( ) is the function to compute the resource usage efficiency; and g( ) is the function to compute the trade-off score.

As will be appreciated, the trade-off analysis may allow to configure the parameters through the parameter user interface 800, and initiate trial deployment of the re-configured neural network model, and view the results, i.e., the loss function and the resource usage value. Further, the record of each trial run may be stored. Furthermore, based on the right trade-off, the user may select a combination of configuration parameters which may help in striking a balance between the resource usage and the quality of object detection. The user may select an appropriate f( ) and g( ) function, based on requirement.

At step 318, a check may be performed to determine whether the computed trade-off value is greater than a predefined threshold, by comparing the computed trade-off value with the predefined threshold. The threshold may be predefined by a user. Alternatively, the threshold may be automatically defined. Based on the comparison, if the computed trade-off value is greater than the predefined threshold, the method 300 may proceed to step 320 ("Yes" path). At step 320, the re-configured neural network model of the current iteration may be selected, and deployed for object detection. However, if the computed trade-off value is less than the predefined threshold, the method 300 may return to step 310 ("No" path). Accordingly, the steps 310 to 318 may be repeated until trade-off value greater than the predefined threshold is obtained.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
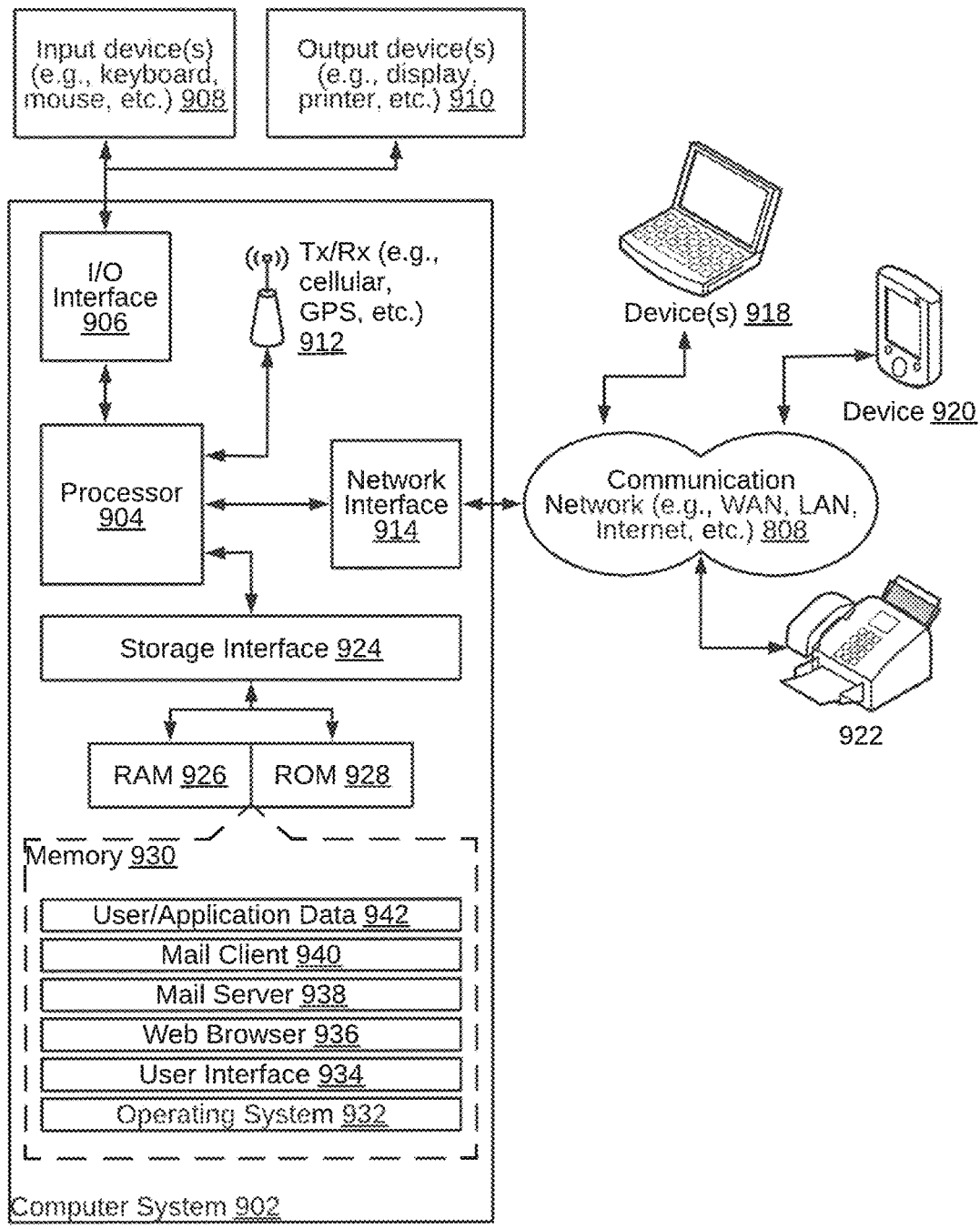
FIG. 9 illustrates a block diagram of an exemplary computer system for implementing various embodiments.

The disclosed methods and systems may be implemented on a conventional or a general-purpose computer system, such as a personal computer (PC) or server computer. Referring now to FIG. 9, a block diagram of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NIN- TENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C #, MICROSOFT.NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to implementing neural network models on edge devices in an IoT network. The techniques provide for configuring a trained CNN model (YOLO neural network model) to be deployed on an edge device, for object detection. The techniques further provide for determining a trade-off value of loss function and resource usage at edge device with accuracy of real-time object detection within resource constraints of edge device.

The above techniques, therefore, provide for striking a balance between resource usage at the edge device and accuracy of real-time object detection by the edge device. In other words, the above techniques provide for configuring an neural network optimized for meeting the criteria of low power, low computation, and low memory, while providing an minimum optimum accuracy of object detection by the edge device (i.e. achieve a trade-off between model accuracy and system resource usage). Further, the techniques for easy and quick deployment of the CNN model for the edge device.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of implementing neural network models on resource-constrained edge devices in an Internet of Things (IoT) network, the method comprising:
   receiving, by a processor of an optimizing device, a Convolutional Neural Network (CNN) model trained and configured to detect objects from images,
      wherein the optimizing device is communicatively coupled to a resource-constrained edge device via a communication network, for re-configuring the CNN model to-be-deployed on the resource-constrained edge device;
   iteratively assigning, by the processor of the optimizing device, a new value to each of a plurality of parameters associated with the CNN model to generate a re-configured CNN model in each iteration, by:
      rendering, by the processor of the optimizing device, a parameter interface to a user, wherein the parameter interface is configured to receive values assigned to one or more of the plurality of parameters from the user, and
         wherein the one or more of the plurality of parameters comprises: a gridsize, a bounding_box_per_grid_cell, an output_class, and a weight for Loss function, and memory allocation to input and output layers of the CNN model;
   initiating, for each iteration, by the processor of the optimizing device, a trial running of the re-configured CNN model on the resource-constrained edge device to identify at least one object in an image;
   computing, by the processor of the optimizing device, for each iteration, a trade-off value based on an image detection accuracy associated with re-configured CNN model and resource utilization data associated with the resource-constrained edge device; and
   selecting, by the processor of the optimizing device, the re-configured CNN model of a particular iteration, for deployment on the resource-constrained edge device based on comparison of the trade-off value calculated for each iteration with a predefined threshold.

2. The method of claim 1, further comprising:
   receiving, by a processor of the resource-constrained edge device, an image from an image capturing device within the resource-constrained edge device; and
   detecting, by the processor of the resource-constrained edge device, one or more objects in the received image, using the re-configured CNN model of each iteration.

3. The method of claim 2 further comprising pre-processing the received image, wherein the pre-processing further comprises one or more of image augmentation, image resizing, image normalization, and format conversion.

4. The method of claim 1, wherein the selecting further comprises:
   comparing the trade-off value calculated for each iteration with the predefined threshold; and
   selecting the re-configured CNN model of the particular iteration, when the trade-off value is greater than or equal to the predefined threshold.

5. The method of claim 1, further comprising storing the values assigned to the one or more of the plurality of parameters in a configuration database.

6. The method of claim 5, wherein iteratively assigning comprises retrieving the stored value associated with each of the plurality of parameters from the configuration database.

7. The method of claim 1, wherein iteratively assigning comprises directly receiving the values assigned to the one or more of the plurality of parameters from the parameter interface.

8. The method of claim 1, wherein the resource usage data associated with the resource-constrained edge device corresponds to one or more of a loss function, memory usage, and Millions of Instructions Per Second (MIPS) usage of the re-configured CNN model run by the processor of the resource-constrained edge device.

9. The method of claim 1, wherein the plurality of parameters comprises at least one of batch_normalize, a filter, a size, a stride, a pad, an activation, a maxpool_size, a maxpool_stride, a bit-width, a batchsize, an input image resolution, an input image height, an input image width, a channel, a learning rate, an epoch, a decay of learning rate, a quantization of weights and biases.

10. An optimizing device for implementing neural network models on resource-constrained edge devices in an Internet of Things (IoT) network, the optimizing device comprising:
   a processor; and
   a memory communicatively coupled to the processor, wherein the memory stores processor instructions, which, on execution, causes the processor to:
      receive a Convolutional Neural Network (CNN) model trained and configured to detect objects from images;
         wherein the optimizing device is communicatively coupled to a resource-constrained edge device via a communication network, for re-configuring the CNN model to-be-deployed on the resource-constrained edge device;
      iteratively assign a new value to each of a plurality of parameters associated with the CNN model to generate a re-configured CNN model in each iteration, by:
         rendering a parameter interface to a user, wherein the parameter interface is configured to receive values assigned to one or more of the plurality of parameters from the user, and
            wherein the one or more of the plurality of parameters comprises: a gridsize, a bounding_box_per_grid_cell, an output_class, and a weight for Loss function, and memory allocation to input and output layers of the CNN model;
      initiate, for each teration, a trial running of the re-configured CNN model on the resource-constrained edge device to identify at least one object in an image;

compute for each iteration, a trade-off value based on an image detection accuracy associated with re-configured CNN model and resource utilization data associated with the resource-constrained edge device; and select the re-configured CNN model of a particular iteration, for deployment on the resource-constrained edge device based on comparison of the trade-off value calculated for each iteration with a predefined threshold.

11. The optimizing device of claim 10, wherein the processor instructions further cause the processor to:

receive an image from an image capturing device within the resource-constrained edge device; and detect one or more objects in the received image, using the re-configured CNN model of each iteration.

12. The optimizing device of claim 11, wherein the processor instructions further cause the processor to pre-process the received image, wherein the pre-processing further comprises one or more of image augmentation, image re-sizing, image normalization, and format conversion.

13. The optimizing device of claim 10, wherein the selecting further comprises:

comparing the trade-off value calculated for each iteration with the predefined threshold; and selecting the re-configured CNN model of the particular iteration, when the trade-off value is greater than or equal to the predefined threshold.

14. The optimizing device of claim 10, wherein the processor instructions further cause the processor to store the values assigned to the one or more of the plurality of parameters in a configuration database.

15. The optimizing device of claim 14, wherein iteratively assigning comprises at least one of:

retrieving the stored value associated with each of the plurality of parameters from the configuration database; or directly receiving the values assigned to the one or more of the plurality of parameters from the parameter interface.

16. A non-transitory computer-readable storage medium having stored thereon, a set of computer-executable instructions causing a computer comprising one or more processors to perform steps comprising:

receiving a Convolutional Neural Network (CNN) model trained and configured to detect objects from images, wherein the optimizing device is communicatively coupled to a resource-constrained edge device via a communication network, for re-configuring the CNN model to-be-deployed on the resource-constrained edge device;

iteratively assigning a new value to each of a plurality of parameters associated with the CNN model to generate a re-configured CNN model in each iteration, by:

rendering a parameter interface to a user, wherein the parameter interface is configured to receive values assigned to one or more of the plurality of parameters from the user, and wherein the one or more of the plurality of parameters comprises: a gridsize, a bounding_box_per_grid_cell, an output_class, and a weight for Loss function, and memory allocation to input and output layers of the CNN model;

initiating, for each iteration, a trial running of the re-configured CNN model on the resource-constrained edge device to identify at least one object in an image;

computing, for each iteration, a trade-off value based on an image detection accuracy associated with re-configured CNN model and resource utilization data associated with the resource-constrained edge device; and selecting, the re-configured CNN model of a particular iteration, for deployment on the resource-constrained edge device based on comparison of the trade-off value calculated for each iteration with a predefined threshold.

* * * * *